United States Patent [19]

Horton et al.

[11] Patent Number: 5,000,273
[45] Date of Patent: Mar. 19, 1991

[54] LOW MELTING POINT COPPER-MANGANESE-ZINC ALLOY FOR INFILTRATION BINDER IN MATRIX BODY ROCK DRILL BITS

[75] Inventors: Ralph M. Horton, Murray; Royce A. Anthon, West Jordan, both of Utah
[73] Assignee: Norton Company, Worcester, Mass.
[21] Appl. No.: 461,373
[22] Filed: Jan. 5, 1990
[51] Int. Cl.$^5$ .................................. E21B 10/46
[52] U.S. Cl. ...................... 175/329; 76/108.2; 164/97
[58] Field of Search ............ 175/329, 330, 410; 76/108.2; 164/97

[56] References Cited

U.S. PATENT DOCUMENTS

| | | | |
|---|---|---|---|
| 1,676,887 | 7/1928 | Chamberlin | 76/108.2 X |
| 1,949,050 | 2/1934 | Howard et al. | 76/108.2 |
| 1,978,319 | 10/1934 | Mowery | 164/97 |
| 1,995,284 | 3/1935 | Zublin | 76/108.2 |
| 3,127,715 | 4/1960 | Christensen | 51/206 |
| 3,757,878 | 9/1973 | Wilder et al. | 175/329 |
| 3,778,237 | 12/1973 | Shapiro et al. | 29/199 |
| 3,778,238 | 12/1973 | Tyler et al. | 29/196.3 |
| 3,880,678 | 4/1975 | Shapiro et al. | 148/11.5 R |
| 4,003,715 | 1/1977 | Cascone | 29/182.3 |
| 4,234,048 | 11/1980 | Rowley | 175/329 |
| 4,244,432 | 1/1981 | Rowley et al. | 175/329 |
| 4,389,074 | 6/1983 | Greenfield | 299/79 |
| 4,423,646 | 1/1984 | Bernhardt | 164/97 X |
| 4,491,188 | 1/1985 | Grappendorf | 175/329 |
| 4,624,830 | 11/1986 | Barr | 164/97 X |
| 4,630,692 | 12/1986 | Ecer | 175/330 |
| 4,669,522 | 6/1987 | Griffin | 164/97 |
| 4,780,274 | 10/1988 | Barr | 419/7 |
| 4,836,178 | 6/1989 | Tomlinson | 76/108.2 X |
| 4,919,220 | 4/1990 | Fuller et al. | 175/329 |

FOREIGN PATENT DOCUMENTS

| | | | |
|---|---|---|---|
| 3515975 | 12/1985 | Fed. Rep. of Germany | 164/97 |
| 1435385 | 11/1988 | U.S.S.R. | 164/97 |

OTHER PUBLICATIONS

"Steady-State Diffusion of Zinc and Manganese at High Concentratins in fcc Cu-Zn-Mn Ternary Alloys", by D. E. Kim and T. S. Park, 51, J. Appl. Phys., p. 1582 (Mar. 1980).
"An X-Ray Diffraction Study on the Microstructures of Cold-worked face-centered cubic Cu-Mn-Zn Alloys, III, Role of Additios of Transitional Solute Mn", by S. K. Ghos and S. P. Sen Gupta, 56, J. Appl. Phys., p. 1213 (Aug. 1984).
"Dealloying of Copper-Manganese and Copper-Zinc Binary and Ternary Alloys", by A. N. Mukherji et al., Chemical Abstracts, 94:1:147397 (1981).
"Steady-state Diffusion in Copper-Manganese-Zinc Alloys", by J. D. Weinberger, Chemical Abstracts, 74:15887 (1971).
"Strong Corrosion-resistant Copper-base Alloys Having Good Casting Properties", by W. Koch et al., Chemical Abstracts, 69:79735 (1968).
"Hot-rollable Copper-Zinc-Manganese Alloy", by S. Shapiro et al., Chemical Abstracts, 75:112298 (1971).
"Copper Alloys", by P. D. Renschen, Chemical Abstracts, 85:196845 (1976).

Primary Examiner—William P. Neuder
Attorney, Agent, or Firm—Marmorek, Guttman & Rubenstein

[57] ABSTRACT

A novel infiltration alloy comprises about 5 to 65% by weight of manganese, up to about 35% by weight of zinc, and the balance copper. Preferably, the infiltration alloy comprises 20% by weight of manganese, 20% by weight of zinc, and the balance copper. The infiltration alloy is useful in the manufacture of matrix bodies such as matrix drill bit bodies. A method for the manufacture of a matrix body comprises forming a hollow mold for molding at least a portion of the matrix body, positioning diamond cutting elements in the mold, packing at least a part of the mold with a powder matrix material, infiltrating the matrix material with the novel infiltration alloy in a furnace to form a mass, and allowing the mass to solidify into an integral matrix body. Because the novel infiltration alloy permits infiltration to be carried out at temperatures below about 1050° C., many diamond cutting elements which begin to deteriorate at temperatures above 1000° C. can be bonded without substantial degradation to the matrix body during the infiltration process, and there is no need to secure them to the matrix body in a subsequent brazing or mechanical bonding step.

22 Claims, 1 Drawing Sheet

LOW MELTING POINT COPPER-MANGANESE-ZINC ALLOY FOR INFILTRATION BINDER IN MATRIX BODY ROCK DRILL BITS

BACKGROUND OF THE INVENTION

The invention relates to an alloy which is useful as an infiltration binder for bonding diamond cutting elements to a matrix body. More particularly, the invention relates to a low melting point copper-manganese-zinc alloy that is useful as an infiltration binder to bond diamond or other superhard cutting elements to a matrix body, such as a matrix drill bit body. The invention also relates to a process for producing a coherent matrix body by infiltrating a matrix powder with the new low melting point copper-manganese-zinc alloy.

The invention described herein is especially useful for the manufacture of rotary drill bits of the kind comprising a bit body having an external surface on which are mounted a plurality of cutting elements for cutting or abrading rock formations, and an inner passage for supplying drilling fluid to one or more nozzles at the external surface of the bit. The nozzles are located at the surface of the bit body so that drilling fluid emerges from the nozzles and flows by the cutting elements during drilling so as to cool and/or clean them. Desirably, the cutting elements are preformed cutting elements having a superhard cutting face formed of polycrystalline diamond or another superhard material.

As will be understood by persons skilled in the art, the term "superhard" is used to describe diamond and cubic boron nitride materials. For convenience, the term "diamond" is used herein interchangeably with the term "superhard" and is meant to include diamond (single crystal and polycrystalline) materials made at high or low pressure (metastable growth), as well as cubic boron nitride materials.

Drag bits for rock drilling are conventionally made by one of two methods. According to one conventional method, a steel body bit is made by machining a large piece of steel to the desired shape, drilling holes in the bit body to receive the diamond-containing cutting elements, and then pressing the diamond cutters into place. The diamond cutters are held in place mechanically by the interference fit of the cutters and the holes when the bits are made by this method. Alternately, the cutters can be brazed to the steel bit body.

According to the other conventional method of making drag bits, a matrix bit body is formed by a powder metallurgy process. U.S. Pat. No. 3,757,878 (Wilder et al) and U.S. Pat. No. 4,780,274 (Barr), which are incorporated herein by reference, are examples of the powder metallurgy used to produce matrix drill bits. In this process, a graphite block is machined to form a mold. A wear-resistant matrix powder, made for example from tungsten carbide powder particles, is placed in the mold, and a steel blank is inserted into the mold on top of the matrix powder. Thereafter, an infiltrating alloy is placed in the mold. When heat is applied, the infiltrating alloy melts and penetrates into the matrix powder to fill the interparticle space. Upon cooling, the infiltrating alloy solidifies and cements the matrix powder particles together into a coherent integral mass. The infiltrating alloy also bonds this coherent mass to the steel blank to form the matrix body bit. A threaded connection is then welded to the end of the steel blank to permit the bit to be attached to a drill string. The furnace temperature required to carry out this process with conventional copper-based infiltration alloys is about 1,065° C. to about 1,200° C.

The diamond-containing cutting elements are attached to a matrix drill bit made in this manner in one of two ways. If the diamond-containing cutters are capable of withstanding the infiltration temperature without substantial degradation, they are placed in the mold before the matrix powder is added and become bonded to the matrix body as a result of the infiltration process. The diamond-containing cutters become an integral part of the matrix drill bit. However, if the diamond-containing cutters cannot withstand the infiltration temperature without substantial degradation, the cutters are attached to the bit body, usually by brazing, after the infiltrated bit is removed from the mold.

Brazing the diamond-containing cutters to the body of the drill bit is less desirable than bonding the cutters directly to the matrix body during the infiltration process. Brazing is an extra step in the manufacturing process which has its own complications. While it would obviously be desirable to eliminate the brazing step in the manufacture of matrix drill bits, many of the diamond-containing cutting elements which are commercially available cannot withstand the infiltration temperatures that are needed with traditional copper-based infiltration alloys. For example, conventional polycrystalline diamond preforms are only thermally stable up to a temperature of about 700° C. to 750° C., and therefore must be brazed to the bit body after it has been infiltrated. More recent polycrystalline diamond preforms, e.g., Geoset TM preforms available from General Electric and Syndax 3 TM preforms available from DeBeers, are nominally thermally stable up to conventional infiltration temperatures of about 1150° C. However, in actual practice, the Geoset TM thermally stable polycrystalline diamond cutting elements begin to degrade at temperatures as low as 1000° C. More recently, DeBeers has developed a polycrystalline diamond preform called STSR Syndrill TM which is thermally stable up to nearly 1000° C.

As a result, there has been an intense search by persons skilled in the art for new infiltration alloys which have much lower infiltration temperatures than those of conventional copper-based infiltrants. U.S. Pat. No. 4,669,522 (Griffin) discloses an essentially two-element copper-phosphorous alloy of eutectic or near-eutectic composition as an infiltration alloy. The infiltration temperature of this alloy is disclosed as being not greater than 850° C., and preferably not greater than 750° C. However, there is reason to believe that this copper-phosphorous infiltration alloy has certain metallurgical problems associated with its use and therefore it has not met with great commercial success.

It is an advantage of the present invention that a new infiltrating alloy which has an infiltrating temperature below about 1000° C. is provided.

It is another advantage of the present invention that a new method for the manufacture of coherent matrix bodies using an infiltration alloy having an infiltration temperature below about 1000° C. is provided.

It is yet another advantage of the present invention that a method for producing matrix drill bit bodies with a copper-based infiltration alloy having an infiltration temperature below about 1000° C. is provided.

SUMMARY OF THE INVENTION

These and other advantages are achieved by means of the present invention which provides a new low melting point infiltration alloy comprising about 5 to 65% by weight of manganese, up to 35% by weight of zinc, and the balance copper. Preferably, the infiltrating alloy comprises about 20 to 30% by weight of manganese, 10 to 25% by weight of zinc, and the balance copper. Most preferably, the infiltration alloy comprises 20% by weight of manganese, 20% by weight of zinc, and the balance copper. An infiltration alloy of this preferred composition has a melting point of about 835° C. and an infiltration temperature, i.e., a temperature at which infiltration can be carried out, of about 950° C. The prior art discloses metal alloys per se of similar composition. See, e.g., U.S. Pat. No. 4,003,715 (Cascone), U.S. Pat. No. 4,389,074 (Greenfield), U.S. Pat. No. 3,778,238 (Tyler et al.), U.S. Pat. No. 3,775,237 (Shapiro et al.), U.S. Pat. No. 3,880,678 (Shapiro et al.), U.S. Pat. No. 3,972,712 (Renschen), etc. However, there has been no previous disclosure of an infiltration alloy of the above composition.

The present invention also provides a coherent, integral matrix body comprising a plurality of cutting elements embedded in a cementing matrix comprising a matrix material infiltrated with an infiltration alloy. The infiltration alloy has the composition mentioned above and is characterized by an infiltration temperature which is about 1050° C. or below, preferably about 950° C. The cutting elements of the matrix body are made from a superhard material, such as a polycrystalline diamond material which is thermally stable at the infiltration temperature. Desirably, the integral matrix body is formed as part of a drill bit body.

In another of its aspects, the present invention provides a method for making an integral matrix body comprising, forming a hollow mold for molding at least a portion of the body, placing cutting elements in the mold, packing at least a part of the mold with powder matrix material, infiltrating the matrix material with an infiltration alloy in a furnace to form a mass, and allowing the mass to solidify into the integral matrix body, the alloy being a copper-based alloy containing manganese and being selected to provide an infiltration temperature which is not greater than about 1050° C. Desirably, the infiltration alloy also contains a quantity of zinc and has an infiltration temperature of about 950° C.

In a preferred embodiment of the invention, there is provided a method for the manufacture of a matrix drill bit body comprising forming a hollow mold for molding at least a portion of the drill bit body, placing cutting elements made from thermally stable polycrystalline diamond material in the mold, packing at least a part of the mold with a powder matrix material, infiltrating the material with an infiltration alloy in a furnace to form a mass, and thereafter allowing the mass to solidify, the alloy comprising about 20% by weight of manganese, about 20% by weight of zinc, and the balance copper, the alloy having a melting point of about 835° C. and an infiltration temperature of about 950° C.

DETAILED DESCRIPTION

In accordance with the present invention, a new infiltration alloy is provided which is useful in the manufacture of a matrix body. In its broadest sense, the new infiltration alloy comprises about 5 to 65% by weight of manganese, about 0 to 35% zinc, and the balance copper. More preferably, the infiltration alloy comprises about 20 to 30% by weight of manganese, about 10 to 25% by weight of zinc, and the balance copper.

Infiltration alloys of these compositions have melting points in the range of about 830° C. to about 980° C., and an infiltration temperature of not greater than about 1050° C. The infiltrating temperature is generally higher than the melting point of the alloy in order to decrease the alloy's viscosity after it has melted, and thus to increase its penetration rate into the matrix powder material. The inventive infiltration alloy may also contain minor amounts of other alloying elements, so long as they do not increase the melting point above about 980° C. For example, the inventive infiltration alloys may also contain about 0.1 to about 5% by weight of silicon, about 0.1 to about 1% by weight of tin, or about 0.1 to about 1% by weight of boron.

Figure 1:
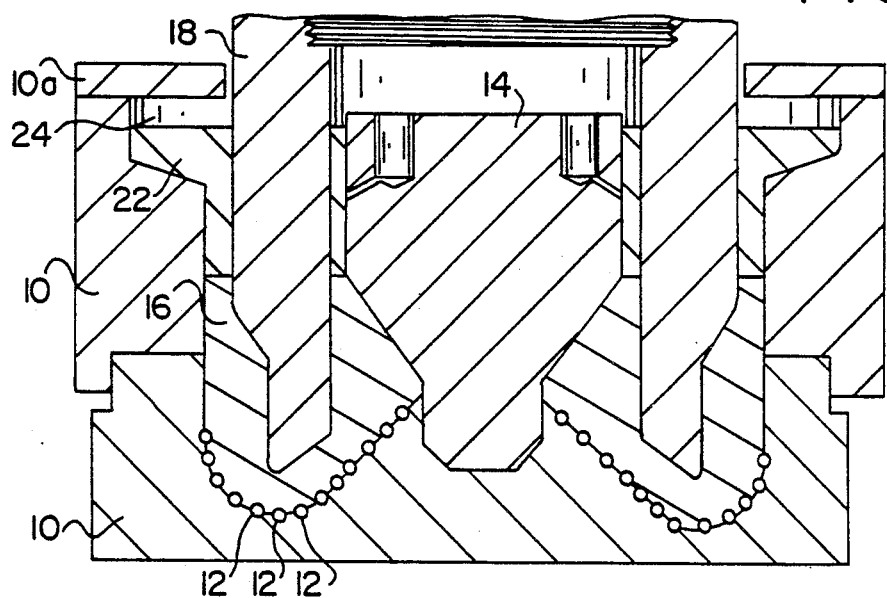
FIG. 1 is a schematic, vertical section through a mold showing the manufacture of a rotary drill bit in accordance with the present invention.

The inventive infiltration alloy may be used to form a matrix drill bit. Referring to FIG. 1, an apparatus and a method for using the new infiltration alloy to form a matrix drill bit are illustrated. The apparatus comprises a two-part mold 10 formed from graphite or another suitable material, such as sand, plaster of Paris, a ceramic material, or a metal coated with a material which is inert to the infiltration binder and the matrix material. The mold 10 has an internal configuration corresponding generally to the required surface of the bit body or portion thereof. The mold 10 includes sockets positioned on its interior surface which are adapted for receiving the diamond cutters 12.

With the upper part of mold 10 and mold cap 10a removed, and with core 14 in place, a layer 16 of matrix powder particles is placed in the mold 10 to cover the protruding diamonds 12 and vibrated into position to compact the powder. The matrix powder 16 preferably comprises particles of tungsten carbide, cast tungsten carbide, or mixtures thereof. Other hard powders, such as carbides, borides, nitrides, and oxides, or metal powders, such as iron, cobalt, tungsten, copper, nickel and alloys thereof, whether coated or uncoated, may also be used. The only constraint on the matrix powder is that it not react with the infiltration alloy during the infiltration process so as to increase its melting point above about 980° C. Desirably, the matrix powder includes a mixture of different sized particles so as to produce high tap density and thereby good wear and erosion resistance.

After the diamond cutters 12 and matrix powder 16 have been placed in mold 10, a steel blank 18 is placed over the mold 10 and above the powder 16. Steel blank 18 is spaced from the surface of the mold 10 and held in position by a suitable fixture (not shown). Thereafter, the upper portion of mold 10 is placed over the blank 18 and a body of infiltrant alloy is placed in the mold 10 as shown at 22, above the matrix forming material both within and around the steel blank 18 and reaching into space 24. The infiltrating alloy is normally in the form of coarse shot or precut chunks. In accordance with the invention, the alloy is a copper-based alloy containing 5 to 65% by weight of manganese, up to 35% by weight of zinc and the balance copper, or more preferably, about 20 to 30% by weight of manganese, about 10 to 25% by weight of zinc, and the balance copper. The alloy has an infiltrating temperature of 1050° C. or less.

After the matrix forming material and the infiltration alloy have been packed into the mold, the assembled mold is placed in a furnace and heated to the infiltration temperature which causes the alloy to melt and infiltrate the matrix forming material in a known manner. This infiltration procedure is carried out at a temperature of less than about 1050° C., and preferably at about 950° C.

Figure 2:
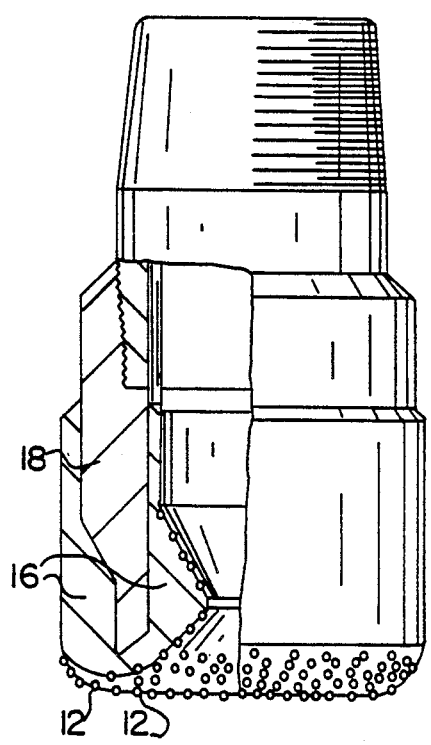
FIG. 2 is a partial sectional view of a rotary drill bit formed in the mold of FIG. 1.

The assembly is then cooled and removed from the mold. A drill bit body such as that shown in FIG. 2 is produced. The drill bit body is thus composed of steel blank 18, having bonded to it the coating of abrasive matrix particles 16 into which are embedded the diamond cutting elements 12. As discussed above, an important advantage of the present invention is that the diamond cutting elements 12 are embedded into the drill bit body during formation of the bit body in the mold since the comparatively low infiltration temperature reduces thermal damage to the diamond cutting elements and permits the use of diamond cutters which would be destroyed at temperatures above 1000° C. There is also less risk of damage due to thermally induced stresses as the bit body cools after formation.

The diamond cutting elements 12 may be any of those conventionally used in the manufacture of matrix drill bits, such as natural or synthetic diamond cutters or cubic boron nitride cutters. However, the present invention finds its greatest utility when the diamond cutting elements 12 comprise thermally stable polycrystalline diamond aggregates, such as the previously mentioned Geoset TM, Syndax 3 TM, or STSR Syndrill TM preforms. The preforms are aVailable in various shapes, for example, as circular discs or in triangular shape. Generally, the preforms comprise a facing layer formed of polycrystalline diamond or other superhard material bonded to a backing layer, such as cemented tungsten carbide. Free standing polycrystalline aggregates that are not bonded to a backing are also suitable as the diamond cutting elements 12. The free standing aggregates may be used as such for the diamond cutting elements. Alternatively, the free standing aggregates may be bonded to a backing or support material in situ during the infiltration process by placing a powdered or solid backing material into the mold in contact with the diamond cutting elements. Diamond films, i.e., diamond material deposited on a substrate under metastable conditions, are also considered to be within the scope of the invention. Thus, the diamond cutting elements 12 placed in the mold 10 may also constitute diamond films deposited on a substrate. If diamond films sufficiently thick are produced, e.g., about 0.5 millimeters thick, the diamond films may be separated from the substrate and may be used by themselves as the diamond cutting elements 12.

Regardless of the exact nature of the diamond cutting elements 12, it is desirable that a metal coating of about 1 to 50 microns thickness be deposited on the underlying superhard particles. The metal coating facilitates the wetting of the superhard particles by the infiltrating alloy, and thus results in a final product wherein the diamond cutting elements 12 are securely embedded in the integral matrix body. Techniques for applying a metal coating to super hard particles are well known to those skilled in the art. See, for example, U.S. Pat. No. 3,757,878 (Wilder et al), for a description of a chemical vapor deposition technique that can be used to deposit a layer of tungsten, molybdenum, tantalum, titanium, niobium, and alloys thereof on the superhard particles. Tungsten is a preferred coating since it is easily wetted by the novel infiltration alloy of the present invention. It is also preferred because it chemically bonds to the underlying superhard particles under the proper conditions, and because it also acts as an oxidation resistant, protective layer for the superhard particles.

The process for producing a matrix drill bit body described above has been carried out successfully using Geoset TM -type polycrystalline diamond preforms, a matrix powder comprising cast tungsten carbide, and an infiltration alloy comprising (1) 20% by weight Mn, 20% by weight of Zn, 0.5% by weight of Si, and the balance copper.

This infiltration alloy had a melting point of about 835° C. and an infiltration temperature of 950° C. At this temperature, the inventive infiltration alloy had an infiltration rate that was only slightly less than conventional infiltrants at 1180° C., while the infiltration rate at 1000° C. was comparable to that of conventional infiltrants at 1180° C.

The above-described process has also been carried out successfully with infiltration alloys of the following compositions:

(2) 20% by weight Mn, 20% by weight Zn, 0.5% by weight Sn, balance Cu;
(3) 20% by weight Mn, 20% by weight Zn, 0.2% by weight B, balance Cu; and
(4) 20% by weight Mn, 25% by weight Zn, 0.2% by weight B, balance Cu.

In carrying out the inventive process as described above, it is important that conditions be maintained that will not necessitate an infiltration temperature above about 1050° C. For example, the matrix powder should not contain any metal powders which would raise the infiltration temperature above 1050° C. Similarly, the flux which is sometimes used to facilitate infiltration of the matrix powder by the infiltration alloy should be a low melting point flux, such as anhydrous $Na_2BO_4$. Other suitable low melting point fluxes are boric acid, boric oxide, fluorides, chlorides, etc. A flux is not needed when infiltration is carried out under vacuum or in an inert atmosphere.

The clay which is used in the mold to displace matrix material for forming a bit body of particular geometry, and the glue which is applied to the surface of the mold to hold particular bit or mold components in place, should both be inert to the infiltration alloy and should not inhibit the infiltration process. A suitable clay comprises a mixture of alumina powder, polyethylene wax (drop point=92° C.), and boric acid. Other matrix displacing materials containing sand, graphite, modeling clay, plaster of Paris, and other castable ceramic materials may also be used. The most suitable glues yet tested are Testor's No. 3501, a cement commonly used for making plastic models, or a polyethylene wax with a drop point above 100° C.

The process described above for making rock drill bits with diamond cutters offers a number of advantages over prior art processes. First, if used below 1000° C. it eliminates the deterioration which occurs in Geoset TM cutting elements which, although nominally stable below temperatures of about 1100° C., begin to degrade at temperatures above about 1000° C. Second, it permits STSR Syndrill TM cutting elements, which are only stable below about 1000° C., to be bonded to the matrix bit during the infiltration process, thus eliminating the need for brazing. Third, it avoids the problem of blistering which occurs in certain metal coatings applied to diamond particles. Certain metal coatings contain a layer of copper. The copper layer tends to blister when the infiltration temperature is above the melting point of copper (1083° C.). However, since the present process is carried out below 1050° C., preferably at a temperature of about 950° C., this problem is avoided. Fourth, since the process is carried out at a relatively low temperature, there is a significant reduction in the thermal stresses which develop during cooling after the infiltrant solidifies. Numerous other advantages will be apparent to those skilled in the art.

It should also be apparent that the usefulness of the inventive infiltration alloy is not confined to the manufacture of matrix drill bits but that it can also be used in any casting process for making a monolithic body by infiltrating a matrix powder and cementing the particles together. For example, the infiltration alloy can also be used in a process for making a wire drawing die wherein a diamond-containing die is bonded to a die block by an infiltration process. Numerous other alternatives and embodiments of the invention will be apparent to those skilled in the art.

We claim:

1. An integral matrix body comprising a plurality of cutting elements embedded in a cementing matrix, said cementing matrix comprising a matrix material and an infiltration alloy, said infiltration alloy comprising about 5 to 65% by weight of manganese, up to about 35% by weight of zinc, and the balance copper.

2. The integral matrix body of claim 1 wherein said infiltration alloy comprises about 20 to 30% by weight of manganese, about 10 to 25% by weight of zinc, and the balance copper.

3. The integral matrix body of claim 1 wherein said infiltration alloy comprises about 20% by weight of manganese, about 20% by weight of zinc and the balance copper.

4. The integral matrix body of claim 1 wherein said infiltration alloy comprises about 20% by weight of manganese, about 25% by weight of zinc, and the balance copper.

5. The integral matrix body of claim 1 wherein said infiltration alloy comprises up to about 5% of an additional alloying element.

6. The integral matrix body of claim 5 wherein said additional alloying element is selected from the group consisting of silicon, tin, and boron.

7. The integral matrix body of claim 1 wherein said infiltration alloy has a melting point below about 980° C.

8. The integral matrix body of claim 1 wherein said infiltration alloy has a melting point of about 835° C.

9. The integral matrix body of claim 1 wherein said infiltration alloy has an infiltration temperature of about 1050° C. or below.

10. The integral matrix body of claim 1 wherein said infiltration alloy has an infiltration temperature of about 950° C.

11. The integral matrix body of claim 1 wherein said cutting elements comprise superhard particles.

12. The integral matrix body of claim 11 wherein said superhard particles comprise a diamond material.

13. The integral matrix body of claim 12 wherein said diamond material comprises polycrystalline diamond material.

14. The integral matrix body of claim 13 wherein said polycrystalline diamond material is thermally stable at an infiltration temperature of said infiltration alloy.

15. The integral matrix body of claim 11 wherein said superhard particles include a metallic outer coating.

16. The integral matrix body of claim 15 wherein said metallic outer coating is selected from the group consisting of tungsten, molybdenum, tantalum, niobium, titanium, and alloys thereof.

17. The integral matrix body of claim 16 wherein said metallic outer coating comprises tungsten.

18. The integral matrix body of claim 16 wherein said superhard particles are bonded to a backing material.

19. The integral matrix body of claim 18 wherein said backing material comprises cemented tungsten carbide.

20. The integral matrix body of claim 1 wherein said matrix material comprises tungsten carbide, cast tungsten carbide, and mixtures thereof.

21. The integral matrix body of claim 20 wherein said matrix material comprises cast tungsten carbide.

22. The integral matrix body of claim 1 further comprising a drill bit body.

* * * * *